Dec. 8, 1959     R. VALENTINE ET AL     2,916,358

APPARATUS FOR DETECTING CARBON MONOXIDE

Filed July 29, 1957     3 Sheets-Sheet 1

INVENTORS
Reginald Valentine
Harold Gordon Glover

INVENTORS
Reginald Valentine
Harold Gordon Glover

By Stevens, Davis, Miller & Mosher
ATTORNEYS

INVENTORS
Reginald Valentine
Harold Gordon Glover
By
ATTORNEYS

United States Patent Office 2,916,358
Patented Dec. 8, 1959

2,916,358

APPARATUS FOR DETECTING CARBON MONOXIDE

Reginald Valentine, Swinton, and Harold G. Glover, Sale, England, assignors to Coal Industry (Patents) Limited, London, England, a company of Great Britain Application July 29, 1957, Serial No. 674,741

9 Claims. (Cl. 23—254)

This invention relates to apparatus for detecting carbon monoxide. Where the atmosphere to be tested includes oxygen, it can be passed over or through a catalyst, such as "Hopcalite," which causes combustion of the carbon monoxide. Burning of the carbon monoxide can however be brought about (even in the absence of atmospheric oxygen) by passing the atmosphere to be tested through an oxidising reagent, such as silver permanganate. In the present specification such catalysts and heat-producing oxidising reagents are collectively referred to as "oxidisers."

It is often of the greatest importance to detect carbon monoxide in an atmosphere and to obtain reliable and speedy warning if the concentration of carbon monoxide rises to a dangerous level, for example when a fire has occurred in mine workings or the like.

It has been proposed to provide such an apparatus comprising differential thermometric means used to ascertain the heat generated by the burning of carbon monoxide or other combustible gas or vapour in the said atmosphere by a catalytic or reactive agent, the apparatus being characterised in that the atmosphere being examined flows in two substantially identical streams through separate conduits of which one conduit contains one part of the differential thermometric means packed in a quantity of catalytic or reactive material whilst the other conduit contains the other part of the said differential thermometric means packed in a similar quantity of inactive material, the heat conductivity of, and the specific heat of the material in both conduits, being substantially the same. Likewise apparatus has been proposed in which the atmosphere being examined flows as a single stream over both parts of a differential thermometric means, one part being surrounded by an inert material and the other part by an oxidiser.

One object of the present invention is to provide an improved portable apparatus of increased reliability.

It is a further object of the invention to provide apparatus for the detection of carbon monoxide in an atmosphere in which a thermistor is juxtaposed with an oxidiser and another thermistor is juxtaposed with an inert material, the oxidiser and the inert material being subjected to the atmosphere to be tested. The thermistors are connected in an electrical circuit adapted to produce a signal indicative of the difference in temperature between the thermistors and hence of the quantity of carbon monoxide in the atmosphere.

In one form of the invention thermionic valves are employed, but in the case of instruments intended for use in mine workings and the like it is preferred to avoid the use of such valves and in another form of the invention transistors are employed.

The temperature sensitivity of transistors is such that a 10° C. rise in temperature can double the current flowing in a transistor. The temperature variations experienced in mine workings are such that it is necessary to compensate in some way for the effect of these variations. Thus, another feature of the invention is a circuit arrangement which considerably reduces the effect of temperature variations.

In order that the invention may be more clearly and fully understood embodiments thereof will be described with reference to the accompanying drawings in which.

Figure 1:
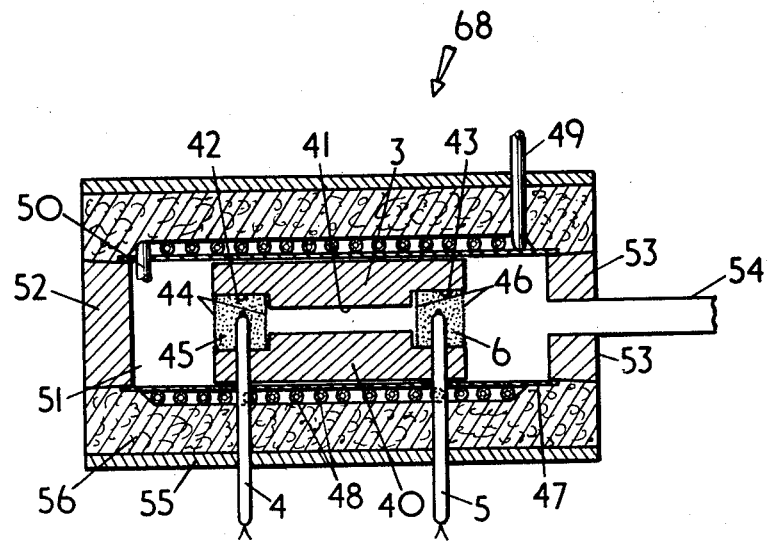
Figure 1 is a side sectional elevation of a preferred construction of a reaction unit for use in one form of apparatus provided by the present invention.

As shown in Figure 1, a reaction tube 3 comprises a cylindrical block 40 of thermal insulating material, such as expanded ebonite, formed with an axial passage 41 having enlarged end portions 42 and 43. A pair of wire gauze screens 44 are fitted into the enlarged portion 42 and the space between is filled with inert material 45 through which the atmospheric gas to be tested can pass. A thermistor unit 4 extends into the material 45 so as to be responsive to temperature changes therein. Similarly spaced screens 46 are fitted into the enlarged portion 43 of the passage and the intervening space is filled with a mass 6 of "Hopcalite" or other suitable oxidiser material, the sensitive end of a thermistor unit 5 being buried in this material. The reaction tube 3 is fitted inside a barrel 47 made of good heat-conducting material, such as copper or brass, and this is surrounded by a helical pipe coil 48, the turns of which are preferably soldered to the barrel. That end 49 of the coil nearest the active material 6 forms the inlet for gas to be tested, while the other end 50 of the coil passes through the barrel 47 into an antechamber 51 formed by a plug 52 closing the end of the barrel 47; the other end is fitted with a plug 53 in which a gas exit pipe 54 is provided. The barrel 47 and pipe coil 48 are surrounded by a jacket 56 of cotton wool or other material having good heat insulating properties, and this is provided with a protective outer casing 55. The provision of the barrel 47 and the coil 48, both of which are good conductors of heat, ensures that any changes of temperature occurring in the surrounding atmosphere are transmitted substantially equally to the two thermistor units 4 and 5, and therefore do not affect the accuracy of the instrument; moreover the parts 47, 48 act as a heat exchanger or heat "sink" ensuring that the temperature of the air by the time it reaches the antechamber 51 and inert mass 45 is substantially equal to that of the air in the passageway 41 and oxidiser mass 6. Nevertheless the expanded ebonite block 3 provides sufficient insulation to allow the temperature of the oxidiser mass 6 to rise as a result of combustion therein.

Figure 2:
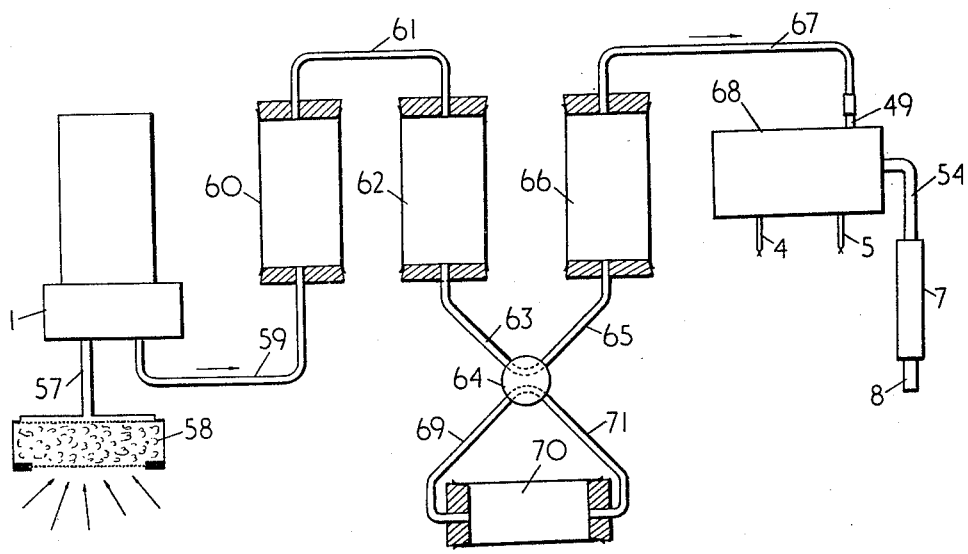
Figure 2 is a partly diagrammatic view of apparatus incorporating the unit of Figure 1.

In practice it is found that the mere abstraction of water vapour from the air to be tested is not sufficient, especially in coal mines, as the atmosphere may contain substances which affect the operation of the oxidiser. A suitable chemical purifier system is shown, therefore, in Figure 2. Upon the inlet 57 of the pump 1 a filter unit 58 containing various grades of filter media is provided to take out solid particles. The delivery pipe 59 of the pump leads into a vessel 60 containing mercuric sulphate and magnesium sulphate and sulphuric acid impregnated on silica gel. This removes unsaturated hydrocarbon vapours. If desired bromine in active charcoal may be used. A pipe 61 then leads to a second vessel 62 containing soda lime or soda asbestos for removing water vapour and acidic gases generally. The outlet 63 passes to a selector valve 64 conveniently of the plug type with two passages in the plug as shown. In normal use the pipe 63 is connected to the inlet 65 of a third vessel 66 containing anhydrous magnesium perchlorate (usually known as "Anhydrone") for removing water vapour and ammonia gas. The purified gas then passes by way of pipe 67 to the inlet 49 of the reaction unit which is indicated at 68 and is of the construction shown in Figure 2. The gas exit pipe 54 is connected to a drying chamber 7 as in the previous example, the final outlet being shown at 8.

The valve 64, when turned through 90° from the normal position shown, connects pipe 63 with the inlet pipe 69 of a vessel 70 filled with active granular "Hopcalite," the outlet pipe 71 then leading the gas through the pipe 65 into the vessel 66. Thus as the gas flows through the "Hopcalite" in the vessel 70 any carbon monoxide present in it is oxidised, so that the gas reaching the reaction unit 68 is absolutely free of carbon monoxide. This is very useful for enabling the indicating portion of the apparatus to be tested and/or calibrated, more particularly with regard to the zero reading.

If desired, in either of the two examples given, more than one pair of thermistor units may be used to obtain a stronger signal of the presence and concentration of carbon monoxide.

Figure 3:
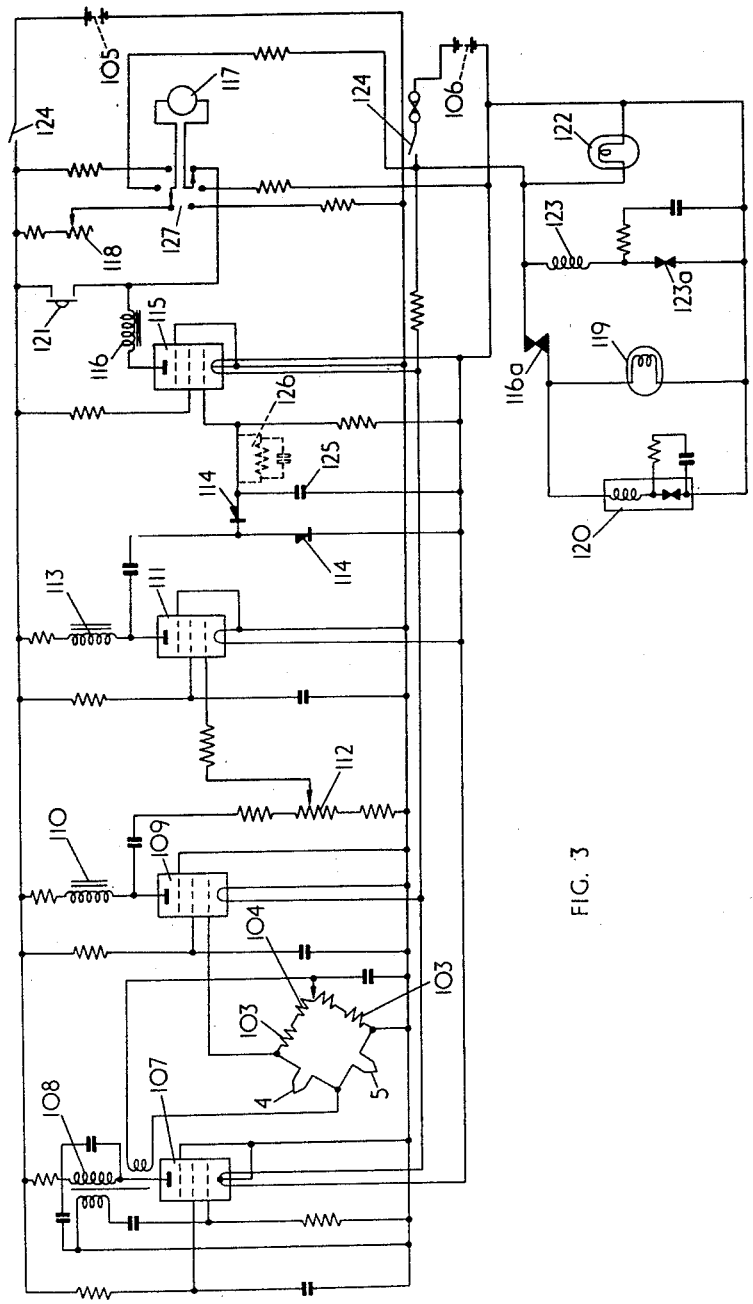
Figure 3 is a diagram of a circuit for use with the apparatus of Figure 2.

A convenient arrangement for the amplifier, indicator and electrical system is shown in Figure 3 and in this diagram, thermistor units 4 and 5 are connected as arms of a Wheatstone bridge including also a pair of resistors 103 and a potentiometer 104 for balancing.

The circuit is fed with power from a high tension battery 105 and a low tension battery 106. The potentiometer 104 is used to balance the bridge until the out-of-balance voltage is zero with both thermistors at the same temperature. The bridge is fed with alternating current from an oscillator valve 107 by means of a third winding on a transformer 108. Any out-of-balance voltage from the bridge is fed between the grid and cathode of an amplifying valve 109 having an anode load inductance 110. The output from this stage is fed between grid and cathode of a second amplifying valve 111. A potentiometer 112 controls the sensitivity of the instrument. The valve 111 has an anode load inductance 113 and the output from this stage is fed to two rectifiers 114 of which one acts as a D.C. restorer and the other charges a condenser 125 between the grid and cathode of an output valve 115. When the bridge is balanced, anode current flows in the output valve 115 and operates a relay 116 to open contacts 116a, the anode current being measured by a meter 117. A variable resistor 118 is used to set the meter to full scale deflection (actually marked zero on the CO scale) when the thermistors are at the same temperature.

If the bridge be unbalanced by the heating of one thermistor by the combustion of carbon monoxide, the out-of-balance voltage is amplified, causing the condenser between the grid and cathode of the valve 115 to become negatively charged and reducing the anode current shown by the meter 117. Thus the meter reading depends upon the amount of carbon monoxide oxidised, and when equilibrium is reached, the deflection of the meter indicates the carbon monoxide concentration.

Upon the anode current being sufficiently reduced, the relay 116 is de-energised and its contacts close the circuits of a warning lamp 119 and buzzer 120.

In the circuit shown in Figure 3, the change in anode current of valve 115 depends upon the change in temperature produced in the reaction chamber. The time taken before the anode current of valve 115 is reduced sufficiently to de-energise the relay 116 and operate the alarms, therefore, depends upon the time taken for the temperature to rise high enough to unbalance the bridge sufficiently for this to occur. The higher the carbon monoxide concentration, the shorter this time will be.

If desired, however, a differentiating circuit of suitable time constant, such as that shown in dotted lines at 126, may be interposed between the condenser 125 and the grid of valve 115, in which case the change in the anode current of valve 115 may be made wholly or partly dependent upon the rate of change of temperature in the reaction chamber.

The differentiating circuit does not affect the operation of the meter 117 which still records the carbon monoxide concentration, once equilibrium has been reached. A pushbutton 121 can be operated to short-circuit the meter 117 and resistor 118 to fully energise the relay 116, this being done in setting the instrument and resetting after the alarm has operated.

The circuit is provided with an indicator lamp 122, switches 124 and appropriate resistors and condensers and the electric pump 123 is connected in the circuit as shown, the interrupter contacts being indicated at 123a (Figure 3). The switch 127 is provided with appropriate resistors so that the voltages of the high tension and low tension batteries may be checked by means of the meter 117 connected as a voltmeter.

Figure 4:
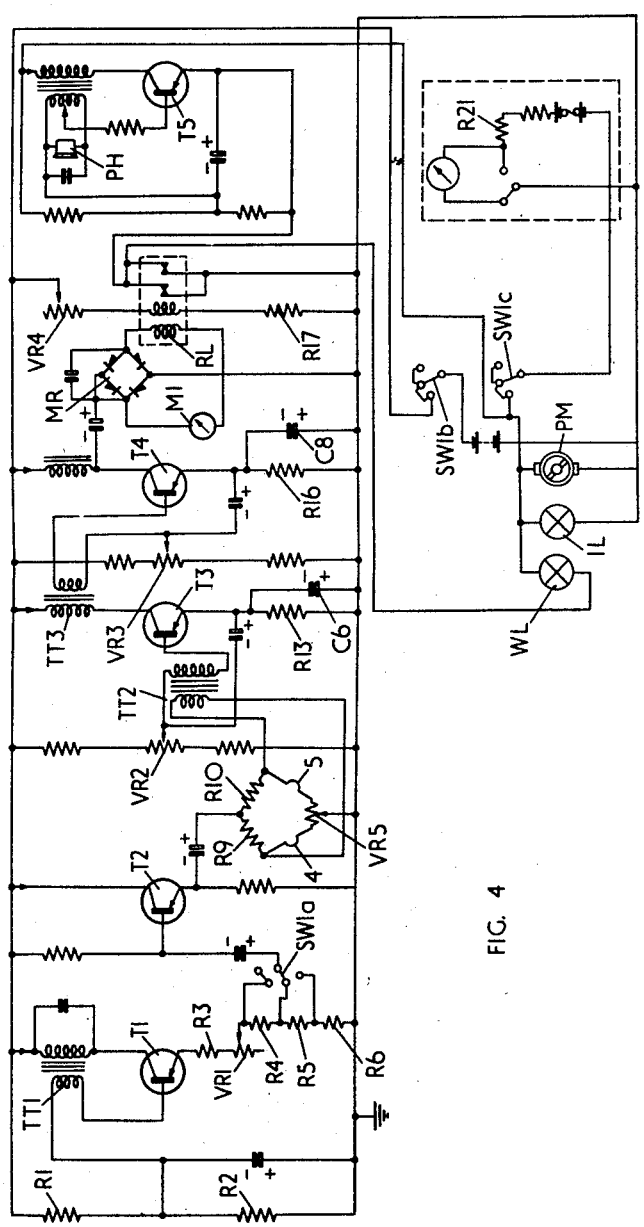
Figure 4 is a diagram of a transistor circuit which can be used in place of the circuit of Figure 3.

In the circuit of Figure 4 transistors are used instead of valves. The thermistors 4 and 5 are again connected in a bridge circuit which is completed by two high stability close tolerance resistors R9 and R10 and a potentiometer VR5. The thermistors are matched as closely as possible but VR5 is still necessary to balance the bridge in the absence of any carbon monoxide. The bridge is fed with a 1.5 kc./s. signal generated by the transistor oscillator T1, this frequency being chosen as the frequency response curve of the amplifier is flat about this frequency, and consequently the oscillator frequency can vary slightly without affecting the gain of the amplifier. A buffer stage comprising transistor T2 is interposed between the oscillator and the bridge so that variations in the impedance of the bridge caused by temperature changes (e.g. 1.5 kc. at 20° C., 1 kc. at 40° C.) do not alter the load on the oscillator. The oscillator T1 is designed to operate with a relatively large resistance provided by resistors R3 to R6 and potentiometer VR1 in its emitter circuit. Its base potential is held relatively constant by the potential divider R1 and R2, and under these conditions, a large degree of D.C. negative feedback is applied between the base and emitter of the transistor which opposes any change in current through the transistor caused by temperature changes. The effects of variations in transistor characteristics are also minimised by this circuit arrangement, but to further reduce these effects, sufficient positive feedback is applied from the transformer TT1 to saturate the transistor on the negative swing and to cut it off on the positive swing. This means that the transistor current swings between zero and a definite maximum, which is determined more by the fixed circuit components than by the transistor and means that the transistor can be replaced without any circuit adjustment being necessary. A rectangular waveform is produced which is quite satisfactory for feeding the thermistor bridge.

The buffer stage T2 is in the grounded collector configuration which is inherently stable and presents no problem as regards temperature variations or replacement.

The net result is that neither of these transistors T1 and T2 are critical and can be replaced by others with no circuit modifications and the effect of temperature on these two stages is small enough to be ignored.

Switch SW1a is the range switch and controls the amplitude of signal fed to the bridge by selecting the tapping on the potential divider R3, VR1, R4, R5 and R6, three ranges 0–.—2%, 0–0.1% and 0–0.5% CO being provided. The variable resistor VR1 controls the signal across the whole potential divider network and is used to set the instrument to the correct sensitivity during calibration. The range resistors R4, R5 and R6 are carefully selected to give accurate agreement on the three ranges.

The bridge output is coupled via transformer TT2 to the transistor amplifier T3, and the output from this amplifier coupled via transformer TT3 to the output transistor T4.

It has not been found possible to eliminate the effects of temperature on these two stages completely, and still retain high gain, and because of variation between transistors it has been necessary to introduce two preset controls VR2 and VR3.

Transistor T3 has a resistor R13 in its emitter circuit to provide D.C. negative feedback as before, but in this case the base potential can be altered by means of VR2 so that the optimum conditions can be obtained. The circuit of the output transistor T4 is similar but in this case the emitter resistor R16 is the maximum value that can be used without limiting the output from T4. Here again the base potential can be adjusted by means of VR3 to obtain the optimum conditions. In both stages, the emitter resistors are decoupled by capacitors C6 and C8 so that the A.C. gain of the amplifier is not reduced. The setting of VR3 also determines the linearity of response of the instrument. The procedure when setting up the instrument is to replace the thermistors by resistance boxes set initially at a value equivalent to the resistance of the thermistors at 20° C. and to plot curves of the bridge unbalance in ohms. against the meter deflection. VR3 is adjusted to obtain the most linear response curve. VR3 is then adjusted to obtain the maximum sensitivity on a large signal from the bridge and then the temperature sensitivity of the instrument is checked by placing in an oven at 40° C. Having determined the variation of sensitivity with temperature VR2 is then adjusted one way or the other from the previous setting of maximum sensitivity depending upon whether the sensitivity of the instrument increased or decreased on raising its temperature. The degree of stability obtained depends upon the particular transistors used, with some transistors it being possible to reduce the variation to 1 or 2 percent rise in sensitivity for a 20° C. rise in temperature, but with others the best that can be obtained is a 6 percent rise for a 20° C. temperature rise. The settings of VR2 and VR3 are always biased on the side of increasing the sensitivity with rising temperature as it is preferable for safety to have an instrument reading too high a CO concentration rather than too low. The controls VR2 and VR3 are only used during the initial setting up of the instrument and are then locked in position as they would only require further adjustment in the even of a component failure e.g. replacing T3 or T4.

The output from transistor T4 is rectified by a meter rectifier MR and the resultant D.C. current is displayed on the 0–1 milliameter M1. This D.C. current also energises one coil of a relay RL, the other coil being energised by a standing D.C. current via network VR4 and R17. This standing current and the relay contacts are adjusted so that in the absence of any signal from the bridge (i.e. no CO) the relay is energised and the contacts are opened. When the signal from the bridge is sufficient to produce a current of ½ ma. (as shown on the meter) in the first relay coil however, this current is in opposition to that of the standing D.C. current in the second coil and the relay is de-energised. The relay contacts then close and the oscillator T5 comes into action which generates an audible signal in the "phone" PH giving audible warning of the presence of carbon monoxide. Additionally a small pilot lamp WL lights and gives a visual warning.

The power for the transistor circuits is derived from a 4.5 volt dry battery, the total current drain being approximately 3 ma. Switch SW1b ganged to switch SW1a controls this battery.

In addition to the warning light WL another pilot light IL is included which lights permanently. The pump motor PM and both pilot lights are powered by an intrinsically safe power pack, i.e. a series resistor is included in the circuit to limit the short circuit current to a value insufficient to ignite an explosive mixture of methane in air. This battery is controlled by the switch SW1c ganged to the switches SW1a and b.

We claim:

1. Apparatus for the detection of carbon monoxide in an atmosphere, comprising a conduit through which a sample of the atmosphere can be passed, a mass of thermal insulating material in said conduit, a mass of oxidiser in said insulating material, a pair of thermistors the temperature sensitive portion of each of which lies within said conduit, said thermistors and said mass of oxidiser being arranged such that the temperature sensitive portion of one only of said thermistors lies within said mass of oxidiser and said mass of oxidiser is situated downstream of said conduit with respect to the temperature sensitive portion of the other of said thermistors, and a heat exchanger through which said sample can be passed before entering said conduit, said heat exchanger having a very high heat capacity compared to the conduit and its contents and a high thermal conductivity along its length, said heat exchanger surrounding said conduit and being arranged such as to effect heat exchange between that portion of said sample which at any given instant is in the heat exchanger and that portion of said sample which at said instant is in the conduit so as to ensure that in the absence of carbon monoxide in the sample the ambient temperatures of said temperature sensitive portions would be substantially equal, and an electrical circuit in which said pair of thermistors is connected, said circuit being arranged to produce a signal indicative of the difference in temperature of said temperature sensitive portions of said thermistors.

2. Apparatus for the detection of carbon monoxide in an atmosphere, comprising a conduit through which a sample of the atmosphere can be passed, a mass of thermal insulating material in said conduit, a mass of oxidiser in said insulating material, a pair of thermistors the temperature sensitive portion of each of which lies within said conduit, said thermistors and said mass of oxidiser being arranged such that the temperature sensitive portion of one only of said thermistors lies within said mass of oxidiser and said mass of oxidiser is situated downstream of said conduit with respect to the temperature sensitive portion of the other of said thermistors, and a heat exchanger through which said sample can be passed before entering said conduit, said heat exchanger having a very high heat capacity compared to the conduit and its contents and a high thermal conductivity along its length, said heat exchanger providing a flow path for said sample which surrounds said conduit and in length substantially exceeds the length of said conduit, and being arranged such as to effect heat exchange between that portion of said sample which at any given instant is in the heat exchanger and that portion of said sample which at said instant is in the conduit so as to ensure that in the absence of carbon monoxide in the sample the ambient temperatures of said temperature sensitive portions would be substantially equal, and an electrical bridge circuit which has in one arm one of said thermistors and in a second arm the other of said thermistors, said circuit being arranged to produce a signal indicative of the difference in temperature of said temperature sensitive portions of said thermistors.

3. Apparatus for the detection of carbon monoxide in an atmosphere comprising a pump by which a sample of the atmosphere to be tested can be passed through the apparatus, a conduit through which said sample can be passed by said pump, a mass of thermal insulating material in said conduit, a mass of oxidiser in said insulating material, a pair of thermistors the temperature sensitive portion of each of which lies within the said conduit, said thermistors and said mass of oxidiser being arranged such that the temperature sensitive portion of one only of said thermistors lies within said mass of oxidiser and said mass of oxidiser is situated downstream of said conduit with respect to the temperature sensitive portion of the other of said thermistors, a heat exchanger through which said sample can be passed before entering said conduit, said heat exchanger having a very high heat capacity compared to the conduit and its contents and a high thermal conductivity along its length, said heat exchanger surrounding said conduit and being arranged such as to effect heat exchange between that portion of said sample which at any given instant is in the heat exchanger and that portion of said sample which at said instant is in the conduit so as to ensure that in the absence of carbon monoxide in the sample the ambient temperatures of said temperature sensitive portions would be substantially equal, electrical bridge circuit in which said pair of thermistors is connected, said bridge circuit being arranged to produce a signal indicative of the difference in temperature of said temperature sensitive portions of said thermistors, a transistor amplifier connected to said circuit for amplifying said signal, and D.C. negative feed back means connected to said amplifier to reduce current variations in the transistor with temperature.

4. Apparatus for the detection of carbon monoxide in an atmosphere, comprising a pump by which a sample of the atmosphere to be tested can be passed through the apparatus, a conduit through which said sample can be passed by said pump, a mass of thermal insulating material in said conduit, a mass of oxidiser in said insulating material, a pair of thermistors the temperature sensitive portion of each of which lies within said conduit, said thermistors and said mass of oxidiser being arranged such that the temperature sensitive portions of one only of said thermistors lies within said mass of oxidiser and said mass of oxidiser is situated downstream of said conduit with respect to the temperature sensitive portion of the other of said thermistors, a heat exchanger through which said sample can be passed before entering said conduit, said heat exchanger having a very high heat capacity compared to the conduit and its contents and a high thermal conductivity along its length, said heat exchanger providing a flow path for said sample which surrounds said conduit and in length substantially exceeds the length of said conduit, and being arranged such as to effect heat exchange between that portion of said sample which at any given instant is in the heat exchanger and that portion of said sample which at said instant is in the conduit so as to ensure that in the absence of carbon monoxide in the sample the ambient temperatures of said temperature sensitive portions would be substantially equal, an electrical bridge circuit in which said pairs of thermistors is connected, said bridge circuit being arranged to produce a signal indicative of the difference in temperature of said temperature sensitive portions of said thermistors, a transistor amplifier connected to said circuit for amplifying said signal, a transistor oscillator connected to said circuit for applying a voltage across said bridge circuit, and two temperature compensating means one connected to said amplifier and one connected to said oscillator to reduce variations in the current in the transistors with ambient temperature differences.

5. Apparatus as claimed in claim 4 in which said temperature compensating means each comprises D.C. negative feed back means.

6. Apparatus for the detection of carbon monoxide in an atmosphere, comprising a pump by which a sample of the atmosphere to be tested can be passed through the apparatus, a body of heat insulating material defining a conduit through which said sample can be passed by said pump, a mass of thermal insulating material in said conduit, a mass of oxidiser in said insulating material, a pair of thermistors the temperature sensitive portion of each of which lies within said conduit, said thermistors and said mass of oxidiser being arranged such that the temperature sensitive portion of one only of said thermistors lies within said mass of oxidiser and said mass of oxidiser is situated downstream of said conduit with respect to the temperature sensitive portion of the other of said thermistors, a heat exchanger through which said sample can be passed lying upstream with respect to said conduit, said heat exchanger having a very high heat capacity compared to the conduit and its contents and a high thermal conductivity along its length, said heat exchanger surrounding and extending beyond said body and being arranged such as to effect heat exchange between that portion of said sample which at any given instant is in the heat exchanger and that portion of said sample which at said instant is in the conduit so as to ensure that in the absence of carbon monoxide in the sample the ambient temperatures of said temperature sensitive portions are substantially equal, and an electrical circuit in which said pair of thermistors is connected, said circuit being arranged to produce a signal indicative of the difference in temperature of said temperature sensitive portions of said thermistors.

7. Apparatus for the detection of carbon monoxide in an atmosphere, comprising a conduit through which a sample of the atmosphere can be passed, a mass of thermal insulating material in said conduit, a mass of oxidiser in said insulating material, a mass of inert material having similar heat characteristics of the mass of oxidiser, said mass of inert material being situated upstream of the conduit with respect to said mass of oxidiser, a pair of thermistors the temperature sensitive portion of each of which lies within said conduit, the temperature sensitive portion of one of said thermistors being located in said mass of oxidiser and the temperature sensitive portion of the other of said thermistors being located in said mass of inert material, a heat exchanger through which said sample can be passed before entering said conduit, said heat exchanger having a very high heat capacity compared to the conduit and its contents and a high thermal conductivity along its length, said heat exchanger surrounding said conduit and being arranged such as to effect heat exchange between that portion of said sample which at any given instant is in the heat exchanger and that portion of said sample which at said instant is in the conduit so as to ensure that in the absence of carbon monoxide in the sample the ambient temperatures of said temperature sensitive portions would be substantially equal, and an electrical circuit in which said pair of thermistors is connected, said circuit being arranged to produce a signal indicative of the difference in temperature of said temperature sensitive portions of said thermistors.

8. Apparatus for the detection of carbon monoxide in an atmosphere, comprising a conduit through which a sample of the atmosphere can be passed, a mass of thermal insulating material in said conduit, a mass of oxidiser in said insulating material, a pair of thermistors the temperature sensitive portion of each of which lies within said conduit, said thermistors and said mass of oxidiser being arranged such that the temperature sensitive portion of one only of said thermistors lies within said mass of oxidiser and said mass of oxidiser is situated downstream of said conduit with respect to the temperature sensitive portion of the other of said thermistors, a heat exchanger through which said sample can be passed before entering said conduit, said heat exchanger having a very high heat capacity compared to the conduit and its contents and a high thermal conductivity along its length, said heat exchanger surrounding said conduit and being such as to effect heat exchange between that portion of said sample which at any given instant is in the heat exchanger and that portion of said sample which at said instant is in the conduit so as to ensure that in the absence of carbon monoxide in the sample the ambient temperatures of said temperature sensitive portions would be substantially equal, an electrical circuit in which said pair of thermistors is connected, said circuit being arranged to produce a signal indicative of the difference in temperature of said temperature sensitive portions of said themistors, and a system of purification means arranged upstream of said heat exchanger whereby a sample of the atmosphere passed through said apparatus has removed from it matter likely to poison said mass of oxidiser.

9. Apparatus for the detection of carbon monoxide in an atmosphere, comprising a pump by which a sample of the atmosphere to be tested can be passed through the apparatus, a conduit through which said sample can be passed by said pump, a mass of thermal insulating material in said conduit, a mass of oxidiser in said insulating material, a pair of themistors the temperature sensitive portion of each of which lies within said conduit, said thermistors and said mass of oxidiser being arranged such that the temperature sensitive portion of one only of said thermistors lies within said mass of oxidiser and said mass of oxidiser is situated downstream of said conduit with respect to the temperature sensitive portion of the other of said thermistors, a heat exchanger through which said sample can be passed before entering said conduit, said heat exchanger having a very high heat capacity compared to the conduit and its contents and a high thermal conductivity along its length, said heat exchanger surrounding said conduit and being such as to effect heat exchange between that portion of said sample which at any given instant is in the heat exchanger and that portion of said sample which at said instant is in the conduit so as to ensure that in the absence of carbon monoxide in the sample the ambient temperatures of said temperature sensitive portions would be substantially equal, an electrical circuit in which said pair of thermistors is connected, said circuit being arranged to produce a signal indicative to the difference in temperature of said temperature sensitive portions of said thermistors, a vessel, a mass of oxidiser in said vessel, and means for selectively inserting said vessel in the path of a sample passed through the apparatus upstream of said conduit.

References Cited in the file of this patent
UNITED STATES PATENTS

| | | |
|---|---|---|
| 1,992,747 | Gilliland et al. | Feb. 26, 1935 |
| 2,042,646 | Willenborg | June 2, 1936 |
| 2,768,069 | Thompson | Oct. 23, 1956 |
| 2,833,629 | Carbonara et al. | May 6, 1958 |

FOREIGN PATENTS

| | | |
|---|---|---|
| 249,088 | Great Britain | May 12, 1927 |